Nov. 24, 1970 E. J. RUOF 3,543,110
CONVERTER CIRCUIT FOR WHEEL SPEED TRANSDUCER
Filed April 4, 1968
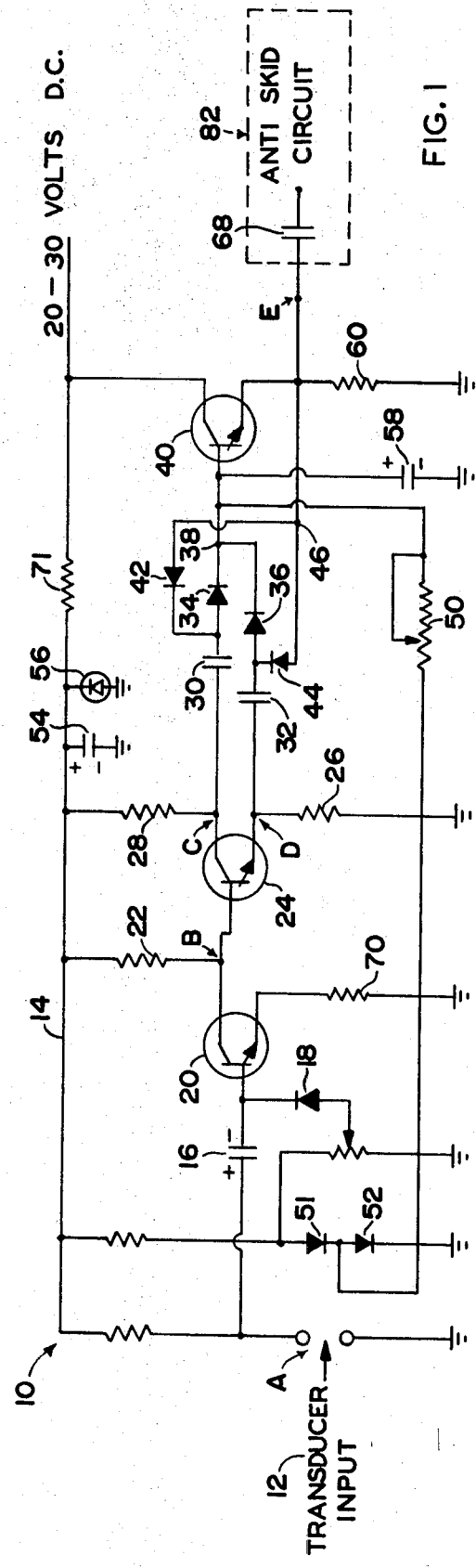
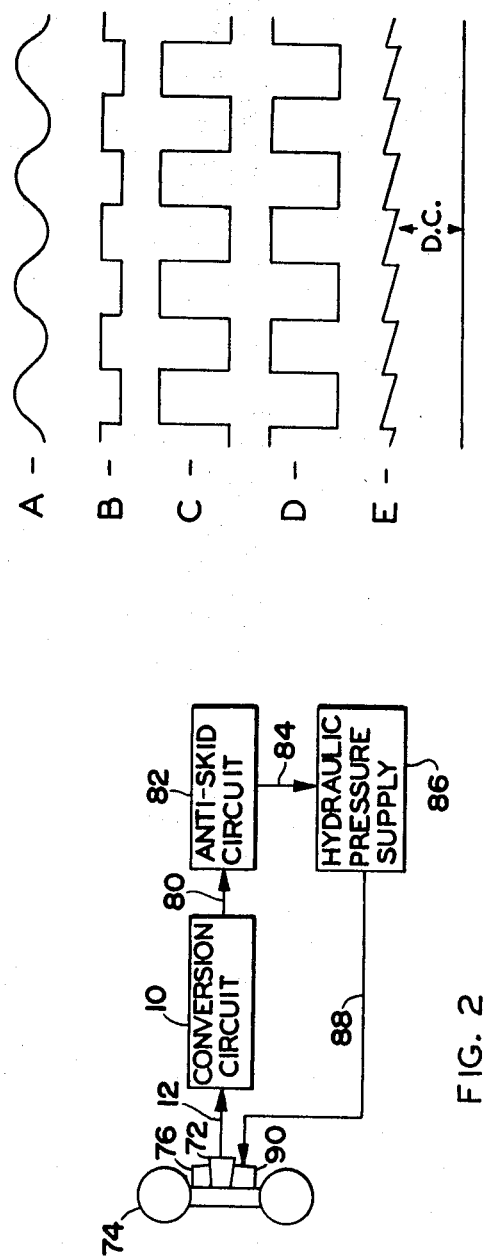
INVENTOR.
EDGAR J. RUOF
BY
*Oldham & Oldham*
ATTORNEYS

United States Patent Office 3,543,110
Patented Nov. 24, 1970

3,543,110
CONVERTER CIRCUIT FOR WHEEL SPEED TRANSDUCER
Edgar J. Ruof, Akron, Ohio, assignor to The Goodyear Tire & Rubber Company, Akron, Ohio, a corporation of Ohio
Filed Apr. 4, 1968, Ser. No. 718,862
Int. Cl. G01p 3/12
U.S. Cl. 324—166     5 Claims

ABSTRACT OF THE DISCLOSURE

The invention converts the alternating signal from a wheel speed transducer into a proportional DC voltage by determining when the alternating signal shifts from either positive to negative or negative to positive and providing capacitor reinforcement at these points of shift, thus in effect doubling the normal periodic capacitor reinforcement presently utilized by the state of the art. In effect, this circuit allows a reduction of ½ in the number of teeth in the design of a normal exciter ring associated with the transducer, thereby permitting the use of larger teeth, wider clearances; and looser tolerances in the transducer pickup.

---

Many occasions arise where it is desirable to obtain an electrical analog of angular velocity. In particular in many cases it is useful to have a DC voltage that is directly proportional to the speed of rotation of a wheel. This DC voltage may be obtained by the use of a DC tachometer generator or by the conversion of an AC frequency into a DC voltage.

In the past numerous methods have been used to obtain the required AC frequency for conversion to the required DC voltage. Among these are:

(1) Gear-like teeth which pass across the poles of a magnetic transducer and thus induce an EMF into a coil which is a part of the transducer, and (2) Photoelectric devices which are activated by alternate areas of high and low light intensity on a rotating member so as to provide pulsations of a frequency proportional to rotational speed.

Regardless of the method used in producing the AC frequency and regardless of its electrical wave shape, most presently used methods of conversion involve alternate replenishment and discharge of an electrical capacitor in a manner such that the amount replenished is exactly offset by the amount discharged during one electrical cycle of operation at a constant input frequency.

The general object of the improved circuit of this invention is to provide two replenishment pulses for each cycle of transducer signal so that half as many transducer cycles will provide an equivalent DC output. In Example 1 above this provides a reduction in the number of teeth in the exciter ring, and in Example 2 above this reduces the number of areas of light intensity, all of which means that the mechanical structure of the pickup does not require such precision and high cost as has heretofore been necessary.

The object of the invention and other objects which will become apparent as the description proceeds are achieved by providing a conversion circuit for the wheel speed transducer. The conversion circuit produces a DC voltage having an amplitude indicating wheel speed. This is characterized by a capacitor adapted to be charged by the amplified and squared signal from the transducer including means to separate the positive portion of the signal from the negative portion of the signal and to replenish the charge of capacitor upon each change of polarity of the alternating signal.

For better understanding of the invention reference should be had to the accompanying drawings wherein:
FIG. 1 is schematic circuit diagram of the electrical circuit utilized to achieve the objects of the invention;
FIG. 2 is a schematic block diagram illustrating the relationship of the circuit of FIG. 1 to an overall antiskid unit associated with the rotating wheel; and
FIG. 3 is a graphic illustration of the wave shape of the electrical signal at critical points in the circuit of FIG. 1.

With reference to the drawings, a numeral 10 indicates generally the electrical circuit comprising the invention which includes a transducer input 12 feeding as a sinusoidal alternating input signal to point A in the circuit. Normally, the invention contemplates that the transducer input signal will alternate from a positive to a negative signal in a sinusoidal manner such as shown by curve A in FIG. 3 of the drawings. One way that this signal could be achieved is by the passage of lugs or teeth on the rotating member through an electromagnetic field of the transducer to break the lines of flux therein and cause the periodic alternation of the signal from the transducer. The frequency of alternation naturally is directly proportional to the speed of rotation of the wheel. In this type of structural setup, more teeth or raised lugs passing through the transducer field during one given rotation of the wheel will give a more accurate resolution to the speed of rotation of the wheel since abrupt changes in wheel rotation speed up or down will be more immediately noted. For example, if only one raised tooth were present, the response of the transducer would necessarily be rather slow if the wheel slowed or stopped abruptly. However, it is an expensive and difficult mechanical problem to have proper tolerance and accurate spacing of the teeth or lugs when a great number are utilized, simply because of the limited physical dimensions of the wheel. Therefore, any electrical method to achieve better resolution or more signals per revolution of the wheel reduces this mechanical problem. Therefore, in effect, the invention contemplates a conventional transducer or other suitable input which does not require an excessive number of teeth or lugs or stripes and hence does not require close tolerances.

The transducer input 12 at point A is impressed on a circuit operating at a regulated DC potential along line 14. Essentially, the conventional portion of the circuit includes a capacitor 16 which couples the AC input signal 12, to the base of transistor 20.

The transistor 20 has its emitter grounded through bias resistor 70, and its collector connected through a resistor 22 to the power source of line 14. The transistor 20, by clipping and limiting techniques, effectively generates a square wave form such as illustrated in FIG. 3 at point B which abruptly goes from one specific positive level to another specific level upon the change from positive to negative or negative to positive of the alternating sinusoidal signal A. This square wave form from point B then feeds into the base of a transistor 24 with the emitter connected to a point D and through a resistor 26 to ground, and the collector connected to point C and through a resistor 28 to a regulated power source line 14. The resistors 26 and 28 are of equal value so wave forms at points C and D are of equal amplitude, but 180° out of phase. The transistor 24 acts as an amplifier and phase inverter. The square wave form at point B is amplified such that points C and D are of equal amplitude but 180° out of phase, because of the relationship of transistor 24 to the circuit and the balance of resistors 26 and 28.

The amplified or reinforced wave forms C and D pass to respective capacitors 30 and 32, and hence through respective diodes 34 and 36. The outputs of the diodes 34 and 36 are joined at a common point 38 and this signal is fed to the base of current amplifying transistor 40 and to a storage capacitor 58. The collector of the transistor 40 is connected to the DC power source with the emitter passing current amplified DC output from capacitor 58 to point E.

Thus it should be understood that in this manner the wave form at point E is a DC output, with a saw tooth superimposed. The DC voltage directly indicates wheel rotational speed. Further, because both wave forms C and D have been used to produce wave form E, the saw tooth peaks represent each point of change of sinusoidal signal A from negative to positive or vice versa, therefore giving a saw tooth of twice the frequency and therefore twice the resolution of the transducer input which, heretofore, utilized only the positive peaks of the sinusoidal input signal to charge a capacitor such as capacitor 58. Therefore, with this circuit, the DC voltage at point E is utilized in measuring the rate of wheel acceleration or deceleration to control the hydraulic supply to the brakes for the wheel, such as shown in my prior Patents 3,026,148 and 2,980,369.

In order to properly insure the linearity of the DC voltage of wave form E, the circuit also incorporates diodes 42 and 44 connecting to a common point 46 to maintain the balance of capacitors 30 and 32 during the period of time between changes of polarity of the alternating signal A. This type of feedback balancing is known by those skilled in the art, as shown in FIGS. 11-28 on pp. 351 of "Pulse and Digital Circuits," by Millman and Taub, printed by the McGraw-Hill Book Company in 1956. Note that diodes 42 and 44 are in a reverse direction from diodes 34 and 36. The DC wave form E is used to charge a capacitor 68 comprising a part of an antiskid circuit 82 in the conventional manner.

In order to provide some flexibility in the circuit of FIG. 1 to compensate for possible component variations and to stabilize the circuit with respect to the temperature, an appropriate variable resistor 50 and diodes 51 and 52 are provided. Regulated voltage on line 14 is provided by capacitor 54 and a silicon voltage regulator diode 56 and resistor 71. These techniques for stabilization and adjustability are common to most transistor circuits.

The basic idea and use of the conversion circuit of FIG. 1 is illustrated in the block diagram of FIG. 2. Specifically, the conversion circuit indicated by block 10 receives the input signal 12 from a transducer 72 connected to a rotatable wheel 74. The wheel 74 mounts an actuating ring 76 which has raised lugs or teeth cooperating with the transducer 72 to produce the signal 12. The conversion circuit 10 produces a DC output signal 80 which feeds into an appropriate antiskid circuit 82. The output 84 of the antiskid circuit 82 actuates a hydraulic pressure supply 86 in any appropriate manner whereby the hydraulic pressure supply sends an actuation signal 88 to control the fluid pressure to a braking unit 90 associated with wheel 74. This is the conventional relationship in an antiskid circuit, and the circuit of the invention merely increases the response without changing the structural configuration of the transducer and actuator ring.

Therefore, it should be seen that the objects of the invention have been achieved by retaining the equivalent performance in the conversion of frequency to DC from a wheel driven transducer when using an exciter ring designed with half the normal number of teeth, or twice the resolution in the conversion of frequency to DC when using an exciter ring designed with the normal number of teeth. The invention will also provide greater signal amplitude from the transducer since the teeth are larger in size, particularly when half the normal number of teeth are utilized, as well as increased clearance between the exciter ring and the transducer making operating tolerances not nearly so critical. Therefore, it should be understood that the invention provides an output signal equivalent or better than an exciter ring of equal diameter and twice as many teeth.

While in accordance with the patent statutes only the best known embodiment of the invention has been illustrated and described, it is to be particularly understood that the invention is not limited thereto or thereby but that the inventive scope is defined in the appended claims.

What is claimed is:

1. A conversion circuit comprising a wheel speed transducer which produces an electrical signal alternating between positive and negative at a frequency proportional to the speed of a vehicle wheel, a first amplifier means to amplify, clip and limit the alternating signal from the transducer to produce an amplified alternating square wave signal, a solid state component connected to receive the square wave signal to thereby produce two similar output amplified square wave signals 180° out of phase, a storage capacitor, circuit means including a first capacitor and a first diode serially connected between one output of said solid state component and said storage capacitor and a second capacitor and a second diode serially connected between the other output of said solid state component and said storage capacitor, said circuit means operating to combine the out of phase square wave signals into a single pulsating DC wave form of twice the frequency of the alternating signal from the wheel speed transducer and which single pulsating DC wave form charges said storage capacitor, a second solid state component connected to amplify the voltage produced across said storage capacitor, a first feedback diode connected between the output of said second solid state component and the circuit point intermediate said first capacitor and said first diode and a second feedback diode connected between the output of said second solid state component and the circuit point intermediate said second capacitor and said second diode, said feedback diodes functioning to maintain linearity in the output of the second solid state component during the positive portions of each of the amplified square wave signals so that the output from the second solid state component is a sawtooth DC signal having an average amplitude directly proportional to the rate of wheel rotation.

2. A conversion circuit according to claim 1 where the solid state components are transistor amplifiers.

3. A conversion circuit according to claim 1 which includes circuit means to maintain voltage regulation for the solid state components.

4. A conversion circuit according to claim 3 which includes circuit means to adjust for component variations and to stabilize the circuit with respect to temperature.

5. A circuit according to claim 2 wherein the transistor producing the out of phase square wave signal has its base driven by the alternating square wave signal, a first resistor having a DC voltage potential connected therethrough to the collector, and a second resistor having the emitter connected therethrough to ground, where the resistance of the first and second resistors is substantially equal.

References Cited

UNITED STATES PATENTS

| 3,244,959 | 4/1966 | Thompson | 324—70 |
| 2,955,202 | 10/1960 | Scourtes | 324—78 |
| 3,338,637 | 8/1967 | Harned | 324—70 |

FOREIGN PATENTS

| 1,028,494 | 5/1966 | Great Britain. |

RUDOLPH V. ROLINEC, Primary Examiner

M. J. LYNCH, Assistant Examiner

U.S. Cl. X.R.

303—21; 317—5